United States Patent [19]

Byrd

[11] Patent Number: 4,593,550

[45] Date of Patent: Jun. 10, 1986

[54] STRIP PREPARATION ROLLERS

[75] Inventor: Lucid L. Byrd, Palos Park, Ill.

[73] Assignee: Allied Tube & Conduit Corporation, Harvey, Ill.

[21] Appl. No.: 755,499

[22] Filed: Jul. 15, 1985

[51] Int. Cl.$^4$ .......................... B21B 1/08; B21B 27/00
[52] U.S. Cl. ........................................ 72/199; 72/52; 228/17
[58] Field of Search ..................... 72/51, 52, 199, 366; 228/17, 17.5, 173.3

[56] References Cited

U.S. PATENT DOCUMENTS

| | | | |
|---|---|---|---|
| 650,873 | 6/1900 | Shively | 72/366 |
| 808,657 | 1/1906 | Heggie | 228/17 |
| 1,066,383 | 7/1913 | DeRemer | 72/366 |
| 1,143,735 | 6/1915 | Slick | 72/366 |
| 2,042,012 | 5/1936 | Lumsden | 76/107 |
| 2,053,375 | 9/1936 | Nicholas | 72/366 X |
| 2,292,810 | 8/1942 | Woeller | 153/54 |
| 2,395,878 | 3/1946 | Keene | 29/188 |
| 3,277,684 | 10/1966 | Gareri | 72/105 |
| 3,456,473 | 7/1969 | Kater et al. | 72/199 |
| 3,636,903 | 1/1972 | Anderson et al. | 72/52 |

FOREIGN PATENT DOCUMENTS 2869 of 1870 United Kingdom .................. 228/17

Primary Examiner—E. Michael Combs
Attorney, Agent, or Firm—Fitch, Even, Tabin & Flannery

[57] ABSTRACT

An improvement in a continuous rolling mill for forming flat steel strip into tubing. The improvement is a strip preparation station including upper and lower composite roller systems. Each system has end rollers which define a pass path for the strip. The lower end rollers have a support surface for engaging the lower surface of the strip and an outer pocket with a lower transition surface extending between the support surface and the outer pocket. Each of the upper end rollers has an engagement surface for contacting the upper strip surface and an outer flange which terminates below the level of the support surface and extends into the pocket. Each upper end roller has a bevelled working surface adjoining the engagement surface and overlying at least a portion of the transition surface and a portion of the support surface for cold working the irregularities of the strip. A method of preparing a strip for formation into a tube in a continuous rolling mill is also disclosed.

8 Claims, 8 Drawing Figures

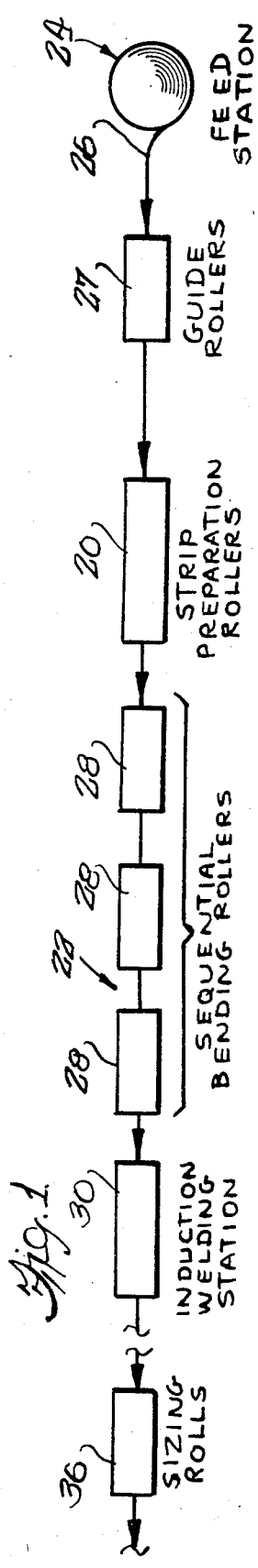
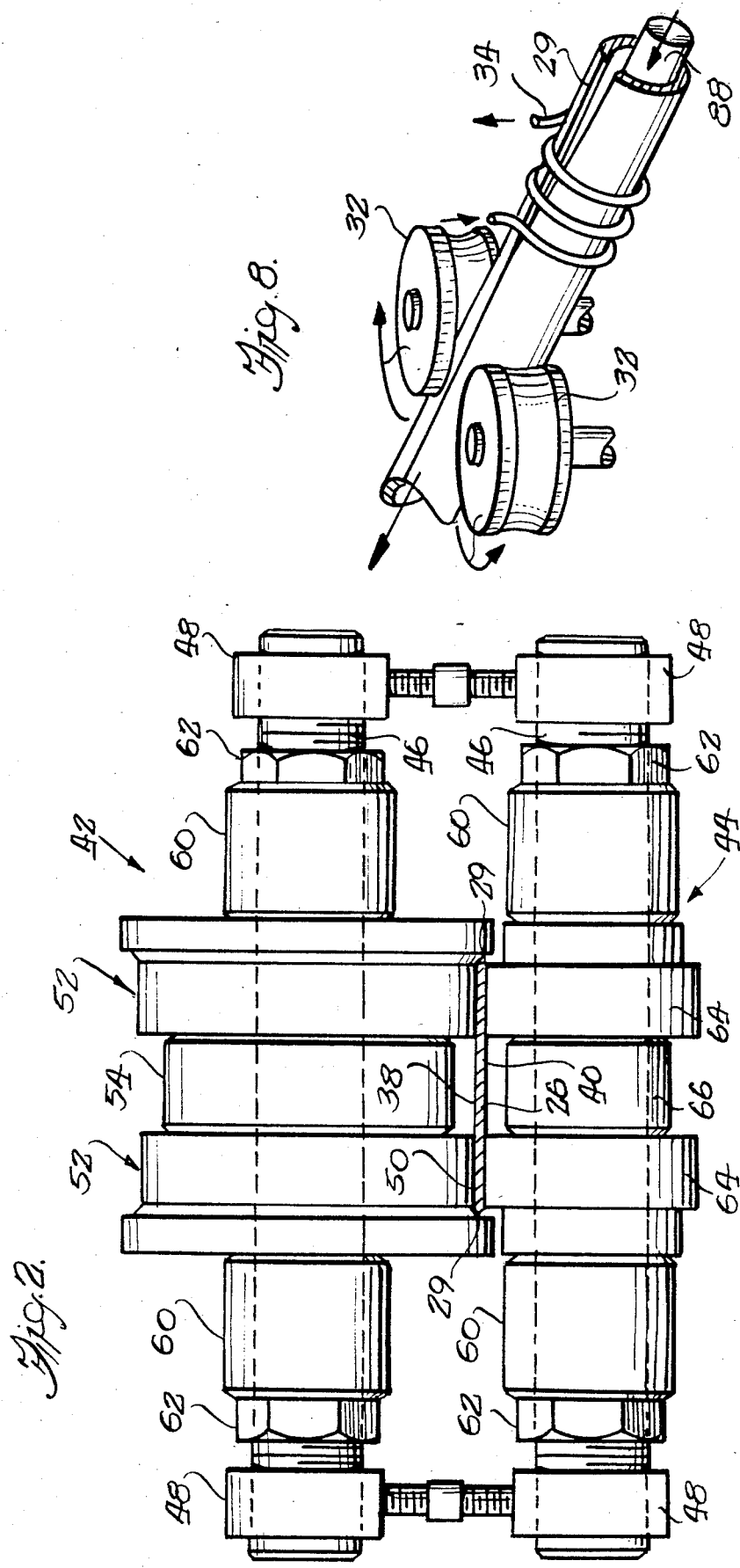

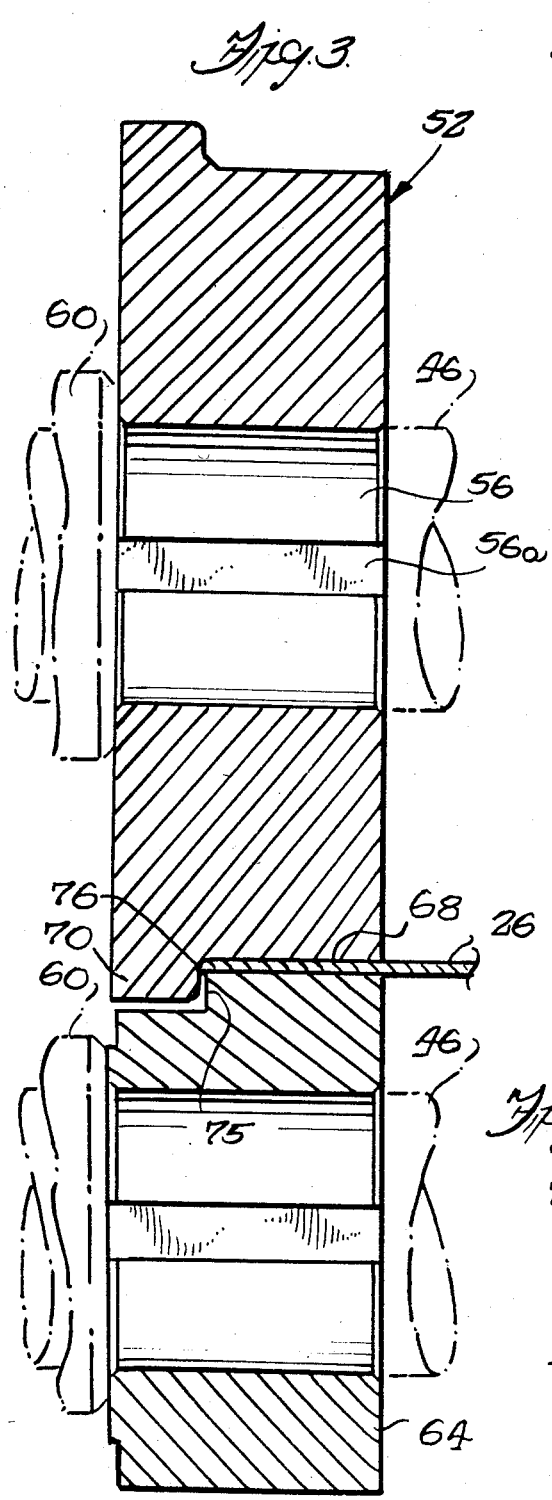
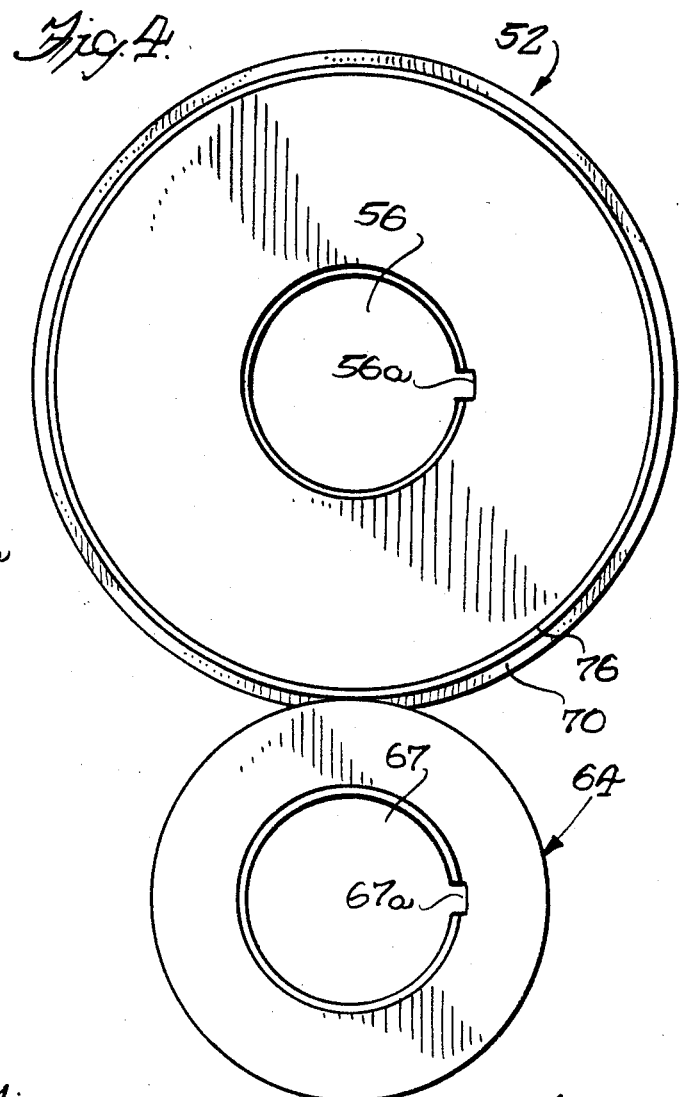
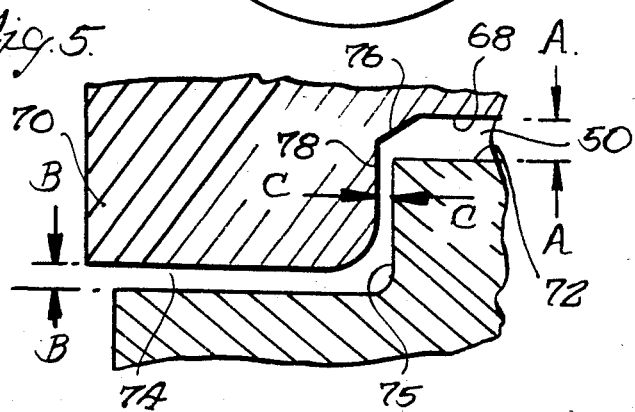
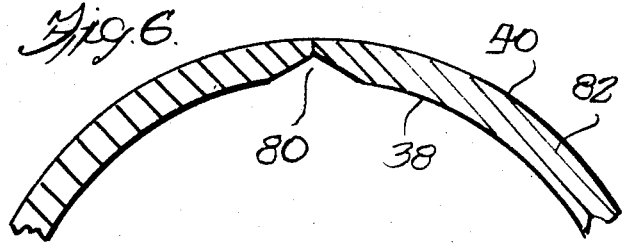
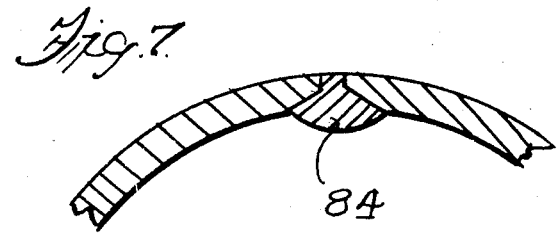

STRIP PREPARATION ROLLERS

The subject invention relates to apparatus for metal working and, more particularly, to rollers for coining the edges of a metal strip for use in a continuous rolling mill.

BACKGROUND OF THE INVENTION

Rolls of strip steel are typically prepared at a steel manufacturing facility by longitudinal cutting of the strip from a sheet having a much greater width. The cutting tool engages the sheet on a cutting entrance side and slices through to the cutting exit side of the sheet where it causes the thus-formed strip to have an upturned, sharpened edge. Using such a strip in a continuous roll forming mill for manufacturing tubing employing induction welding would result in an unacceptable product because the extent of the welding bead formed on the inside of the tubing could not be controlled. A large or irregular interior bead could cause interference in telescopic mating of different sizes of tubing, or, where the tubing is used to convey a fluid, it could restrict the flow of a fluid through the tubing, aside from presenting an unsightly appearance. A steel strip with coined edges can be specially ordered from steel manufacturers; however, the strip now becomes "non-standard" requiring special additional manufacturing operations and resulting in a significantly increased price over a "standard" strip roll.

Tubing manufacturers have typically purchased standard strip rolls, often times cut the strip themselves to narrower widths, and removed upturned edge portions through grinding and/or cutting operations preliminary to tubing formation. Unfortunately, such operations can produce burrs, slivers or a residue of a magnetizable substance which can interfere with induction welding. In an extreme situation, a high frequency welding coil, formed by turns of copper tubing through which a cooling fluid is passed, can be destroyed by a steel particle attaching to the coil, through hysteresis heating of the particle causing melting of the tubing and release of the cooling fluid.

A tool for simultaneously rounding edges of a plurality of strips upon exit of the strips from a longitudinal severing operation, is shown in U.S. Pat. No. 3,456,473. The tool includes composite rollers on upper and vertically aligned lower shafts with the rollers including rounding rings having working surfaces for rounding both upper and lower surfaces of both edges of each strip. Other than the strip pass paths, which the strips completely fill, the upper and lower composite rollers engage each other at spaced locations throughout their coextension. The rings, which are coextensive with the rounded edges, are spaced by bushings which engage the upper and lower surfaces of the strips.

Rollers having working surfaces for providing parallel bevelled surfaces at the two edges of the strip have also been suggested. For further information concerning the structure and operation of such rollers, reference may be made to U.S. Pat. No. 2,292,810.

SUMMARY OF THE INVENTION

Among the several aspects and features of the present invention may be noted the provision of improved rollers for preparing strip steel for use in a continuous tube mill. The rollers function to coin the lateral edges of the strip so that, when they are brought together to form a tube, the edges define an interior groove for receiving the welding bead resulting from induction welding thereby controlling the extent of protrusion of the bead into the interior space defined by the tubing. Furthermore, the rollers work any slivers or burrs on the edges back into the strip so that these irregularities are not available to interfere with the induction welding equipment. The rollers are spaced so that friction and wear are reduced and are reliable in use, have long service life and are relatively simply and economical to manufacture.

Briefly, a strip preparation station embodying various features of the present invention includes upper and lower composite roller systems each having a pair of end rollers which together define a pass path for the strip. Each lower end roller has a support surface for engaging the lower surface of the strip and an outer pocket with a lower transition surface extending between the support surface and the outer pocket. Each upper end roller is provided with an upper engagement surface for contacting the upper strip surface and an outer flange which terminates below the level of the support surface and extends into the pocket. Each upper end roller further includes a bevelled working surface adjoining the engagement surface and overlying at least a portion of the transition surface and a portion of the support surface, for cold working irregularities of the strip.

BRIEF DESCRIPTION OF THE DRAWINGS

FIG. 1 is a block diagram of various components of a continuous rolling mill, for forming steel tubing from a steel strip, including composite strip preparation rollers embodying various features of the present invention;

FIG. 2 is a front elevational view depicting the strip preparation rollers conditioning the edges of the strip by cold working to return any irregularities, such as burrs or slivers, to the strip edge surfaces;

FIG. 3 is a cross-sectional view enlarged in size of the lefthand set of upper and lower working rollers shown in FIG. 2, included in the composite rollers, shown in FIG. 2, for conditioning one edge of the strip;

FIG. 4 is a side elevational view of the working rollers of FIG. 3;

FIG. 5 is an enlarged sectional view of a portion of the working rollers shown in FIG. 3;

FIG. 6 is a cross-sectional view of a portion of the tubing just prior to induction welding;

FIG. 7 is a cross-sectional view of a portion of the tubing after induction welding; and FIG. 8 is a perspective view showing various components for induction welding the tubing.

Corresponding reference characters indicate corresponding components throughout the several views of the drawings.

DESCRIPTION OF THE PREFERRED EMBODIMENT

Referring now to the drawings, a strip preparation station for use in a continuous roll forming tube mill 22 is generally indicated in FIG. 2 by reference numeral 20. As shown in FIG. 1, the mill 22 may include a feed station 24 for supplying an elongated steel strip 26. The strip, in coil form, is mounted on a payout reel suitably rotatably supported at the feed station 24. The strip 26 is received, in its flat form, at a guide station 27 which functions to hold the strip from lateral movement. Next the strip passes through the strip preparation station 20 where the lateral edges 29 of the strip are coined. The strip is next received at the first of possibly several breakdown and closure stations 28 employing forming rolls which function to sequentially transversely bend the strip from its generally planar condition causing the lateral edges 29 of the incipient tubing to be brought together.

Next downstream is a welding station 30 including a plurality of weld rollers 32 (best shown in FIG. 8) which push the lateral edges 29 together. It is between the location of the weld rollers and the last forming-rolls station 28 that the lateral strip edges 29 first come into abutment. An induction coil 34 is disposed generally coaxially with the incipient tubing and positioned slightly upstream of the location where this first abutment occurs. A high frequency current is applied to this coil which induces current in the tubing resulting in the seam welding thereof.

After completion of the seam welding, the tubing advances to a scarfing and sizing station 36 where rollers compressively engage it to insure satisfactory roundness and to give the tubing its final outside dimensions. As is well known to those of skill in the art, the mill 22 may have other stations; for example, a coating station where a lacquer may be applied to the tubing for corrosion protection. The mill could also include a curing station to process the coating, a helper station to apply tension to the tubing to keep it taut, and a cutting station where the tubing is severed into lengths.

The steel strip supplied by the steel manufacturer, or cut to width prior to installation at the feed system 24, typically has raised, sharp edge portions, resulting from a cutting tool exiting from a steel sheet from which the strip 26 is longitudinally severed. Referring to FIG. 2, the strip 26 has a first or upper surface 38 and a second or lower surface 40. The raised, sharp edge portions or other irregularities, such a burrs or slivers, extend from the upper surface at or adjacent to the lateral strip edges 29. The upper strip surface 38 becomes the inside surface of the tubing while lower strip surface 40 becomes the outside surface of the tubing. If the raised edge portions of the strip are not removed, they will extend or will cause a welding bead to extend too far into the interior of the tubing. This could potentially interfere with mating of different size tubes intended to telescope, or if the tube is used to carry a fluid, could restrict the flow or render turbulent the flow of a fluid through the tubing.

The strip preparation roller station 20 includes an upper composite roller system 42 and a lower composite roller system 44. Each system includes a shaft 46 having a key with each shaft rotatably supported between a pair of pillow blocks 48. The shafts 46 preferably are caused to rotate due to the frictional engagement between the roller systems and the strip. Alternatively, rather than being idler roller systems, the roller systems could be driven. The shafts 46 extend substantially horizontally and lie in a common vertical plane. The upper roller system pillow blocks 48 are supported by the lower pillow blocks 48 by adjustable structural components, such as screw means, so that the relative separation of the upper and lower strip preparation rollers can be adjusted by raising or lowering the upper roller system to accommodate a range of strip thicknesses, i.e., from 0.109 inch to 0.120 inch. The upper and lower roller systems, which include aligned components and define a strip pass path 50, are out of contact with each other throughout their coextension to reduce friction and lessen wear on the various components. The strip preparation roller station includes other structure for fixedly supporting the lower pillow blocks, as will be understood by one of skilled in the art.

The upper composite roller system 42 includes a pair of identical upper end working rollers 52 separated by an upper intermediate spacer 54. As best shown in FIG. 4, each roller 52 has a central shaft-receiving passageway 56 with an adjoining keyway 56a for mounting the rollers on the shaft. The upper roller system may also include end spacers 60 and end nuts 62 mounted on a threaded portion of the upper shaft 46 to hold the rollers 52 against lateral movement on the upper shaft. The spacer 54 preferably has a diameter smaller than that of the rollers 52 so that the spacer does not contact the upper strip surface 38. By using intermediate and end spacers of preselected widths, the spacing between the working rollers 52 can be adjusted to accommodate strips 26 of differing widths.

The lower composite roller system 44 includes a pair of identical lower end rollers 64 which complement the upper roller 52, separated by a lower intermediate spacer 66. Each roller 64 has a central shaft-receiving passageway 67 with an adjoining keyway 67a for mounting the lower end rollers on the shaft. As with the upper roller system, the lower system includes end spacers 60 and end nuts 62 so that each lower end roller is vertically aligned with its corresponding upper working roller 52. Also the lower intermediate spacer 66 preferably has a diameter less than rollers 64 so the spacer 66 remains out of contact with the lower strip surface 40.

Referring to FIGS. 3 and 5, each of the upper end rollers 52 has an upper engagement surface 68 for contacting the upper strip surface 38. Each roller 52 also has an outer flange 70 which terminates below the level of the engagement surface 68. The lower end rollers each have a support surface 72 (spaced from engagement surface 68 a distance A—A, approximately equal to the strip thickness) for engaging the lower surface 40 of the strip 26, and an outer pocket 74 for receiving the flange 70 of the corresponding upper roller 52 (the flange 70 is vertically spaced from the lower roller 64 a distance B—B). In each lower roller 64, a generally vertically disposed transition surface 75 extends intermediate the support surface 72 and the outer pocket 74.

Each upper roller 52 is provided with a bevelled working surface 76, preferably at an angle of about 30 degrees to the horizontal, adjoining the engagement surface 68 for coining a strip lateral edge to cold work any irregularity at the strip edge 29 back into the strip 26. The bevelled working surface 76 overlies the vertical transition surface 75 and a short section of the outer portion of the lower support surface 72. Extending from the bevelled surface 76 and partially defining the outer flange 70 of each upper roller 52 is a generally vertically disposed junctional surface 78. The vertical transition surface 75 of the lower roller 64 and the facing junctional surface 78 of the corresponding upper roller 52 are preferably substantially parallel and have a spacing (C—C, FIG. 5) of between eight and twelve thousandths of an inch, and most preferably about ten thousandths of an inch.

The spacing between the upper and lower roller systems, in general, and between the transition surface 75 and the junctional surface 78, in particular, provides a tolerance for any slight misalignment of components. Additionally, the particular gap between the transition surface 75 and the junctional surface 78 is carefully controlled to be insufficient for strip material to enter because the material is unable to bend at such a sharp angle. The bevelled working surface 76 preferably terminates above the level of its corresponding lower end roller 64. The roller systems are dimensioned so that the strip 26 with its upturned lateral edge portions is essentially coterminous with the lower support surfaces 72. As the bevelled working surfaces 76 coin (that is, form a bevel on) the upturned material and cold work any burrs or slivers back into the prepared strip, the strip material expands slightly laterally and enters the space above and to the side of each support surface 72 but without entering the gap between the transition surface and the facing junctional surface. The presence of the flange 70 on each upper roller 52 thus acts effectively to trap all the strip material within the confines of the strip itself although the upper roller 52 and its corresponding lower roller 64 never touch.

Referring to FIGS. 6-8, the tubing just prior to welding is shown in FIG. 6. The coined lateral edges form a V-shaped groove 80 on the interior of the tubing 82 for reception of a bead 84, resulting from induction welding, and thus control the extent of protrusion of the bead inside the tubing. FIG. 7 illustrates the tubing after completion of the welding as it comes from the scarfing and sizing station 36. Components of the welding station are shown in FIG. 8 and include the coil 34, preferably formed of copper tubing through which a coolant is passed, which acts as the primary winding of a transformer. A high frequency current (200-600 kHz) is applied to the coil 34. The about-to-be-completed tubing acts as a one turn secondary winding. Due to the skin effect, radio frequency currents flow near the surfaces of the conductor formed by the tubing. An impeder 88 extends inside the tubing to control the impedance inside the tubing so that induced current flows around the outside of the tubing, up one lateral edge to where the edges 29 first abut, across the abutting edges (a relatively high resistance location), and down the other lateral edge to return to the transverse flow across the outside of the tubing. This current path results in heating of the lateral edges to a plastic condition so that the weld rolls 32 can push the plasticized edges together to complete the seam welding process with the formation of the welding bead 84 in the groove 80. But for the presence of the strip preparation roller station 20, a sliver of metal might be carried with the strip toward the coil 86. If such a sliver of steel became adhered to the coils, it could result in melting of the copper tubing due to hysteresis heating.

As a method, the present invention includes several steps:

(A) The strip 26 is oriented so that the irregularities resulting from the cutting of the strip from a steel sheet extend from the upper strip surface 38 at the lateral strip edges 29.

(B) The strip top surface is bevelled at the lateral edges.

(C) The strip 26 is transversely bent so that the lateral edges 29 are brought together to form a tube 82 with the bevelling forming a V-shaped groove 80 on the inside surface of the tubing.

(D) The lateral edges are induction welded together so that the resulting welding bead 84 is received in the V-shaped groove 80.

In view of the above, it will be seen that the several objects of the invention are achieved and other advantageous results attained.

As various changes could be made in the above constructions without department from the scope of the invention, it is intended that all matter contained in the above description or shown in the accompanying drawings shall be interpreted as illustrative and not in a limiting sense.

What is claimed is:

1. An improvement in a continuous rolling mill for forming flat steel strip into tubing, said strip having a first surface and a second surface with said first surface becoming the inside surface of said tubing and said second surface becoming the outside surface of said tubing, said strip having lateral edges with irregularities at the edges adjacent said first surface due to cutting of said strip from a wide strip, said improvement comprising:

a strip preparation station for cold working the strip edges to form bevels on said edges at said first surface, said strip preparation station comprising:

an upper roller means including a pair of upper end working rollers rotatably mounted on an upper, substantially horizontally extending shaft;

a lower roller means, aligned with said upper roller means and spaced therefrom throughout their coextension, including a pair of lower end rollers rotatably mounted on a lower, substantially horizontally extending shaft, said upper and lower shafts being disposed in a common vertical plane;

said upper end working rollers and said lower end rollers defining a pass path for said strip, each of said lower end rollers having a support surface for engaging the second surface of said strip and an outer pocket with a lower transition surface extending intermediate said support surface and said outer pocket, each of said upper end rollers having an upper engagement surface for contacting the first surface of said strip and an outer flange which terminates below the level of said support surface and extends into said pocket, each upper end roller having a bevelled working surface adjoining said engagement surface and overlying at least a portion of said transition surface and a portion of said support surface for cold working the irregularities of said strip whereby said strip edges are coined so that, when said edges are brought together to form said tubing, a groove is formed on the inside surface thereof to receive a bead formed by induction welding.

2. An improvement as set forth in claim 1 wherein each upper roller includes a junctional surface extending from said bevelled surface and partially defining said flange, the minimum spacing between said junctional surface and said transition surface being between eight and twelve thousandths of an inch.

3. An improvement as set forth in claim 2 wherein the last-mentioned surfaces are substantially parallel and said minimum spacing is about ten thousandths of an inch.

4. An improvement as set forth in claim 1 wherein said bevelled surface terminates above the level of its corresponding lower end roller.

5. An improvement as set forth in claim 1 wherein upper roller means is composite and includes an upper intermediate roller spacing said upper end working rollers.

6. An improvement as set forth in claim 5 wherein said lower roller means is composite and includes a lower intermediate roller spacing said lower end rollers.

7. An improvement as set forth in claim 6 wherein said upper intermediate roller has a diameter less than said upper end working rollers, and said lower intermediate roller has a diameter less than said lower end rollers whereby said upper and lower intermediate rollers do not engage said strip.

8. A strip preparation station for cold working the lateral edges of a flat steel strip having a first surface and a second surface extending between said edges, to form bevels on said edges at said first surface, said strip preparation station comprising:

an upper composite roller means including a pair of upper end working rollers spaced by an upper intermediate roller with said upper rollers rotatably mounted on an upper, substantially horizontally extending shaft;

a lower composite roller means, aligned with said upper composite roller means and spaced therefrom throughout their coextension, including a pair of lower end rollers spaced by a lower intermediate roller with said lower rollers rotatably mounted on a lower, substantially horizontally extending shaft, said upper and lower shafts being disposed in a common vertical plane;

said upper end working rollers and said lower end rollers defining a pass path for said strip, each of said lower end rollers having a support surface for engaging the second surface of said strip and an outer pocket with a lower transition surface extending intermediate said support surface and said outer pocket, each of said upper end rollers having an upper engagement surface for contacting the first surface of said strip and an outer flange which terminates below the level of said support surface and extends into said pocket, each upper end roller having a bevelled working surface adjoining said engagement surface and overlying at least a portion of said transition surface and a portion of said support surface for cold working the irregularities of said strip.

* * * * *